United States Patent
Chen

(10) Patent No.: US 6,507,418 B1
(45) Date of Patent: Jan. 14, 2003

(54) SHEET FEEDER SCANNER

(75) Inventor: Philip L. Chen, Rolling Hills, CA (US)

(73) Assignee: Avision Inc., Hsinchu (TW)

( * ) Notice: Subject to any disclaimer, the term of this patent is extended or adjusted under 35 U.S.C. 154(b) by 0 days.

(21) Appl. No.: 09/425,899

(22) Filed: May 19, 2000

Related U.S. Application Data

(63) Continuation-in-part of application No. 08/696,569, filed on Aug. 6, 1996, now abandoned.

(51) Int. Cl.[7] ................................................. H04N 1/04
(52) U.S. Cl. ....................... 358/498; 358/474; 358/494; 358/496
(58) Field of Search .............................. 358/474, 486, 358/494, 496, 497, 498, 487, 488

(56) References Cited

U.S. PATENT DOCUMENTS 5,523,858 A * 6/1996 Yamada et al. .............. 358/412
5,621,544 A * 4/1997 Ogura et al. ................. 358/494

* cited by examiner

*Primary Examiner*—Mark Wallerson
(74) *Attorney, Agent, or Firm*—Winston Hsu

(57) ABSTRACT

A sheet feeding scanner has its contact image sensor hanging pivotally on two side walls and is capable of turning with respect to the axis of the pivots. The contact image sensor presses against a driving roller by gravity and/or by a spring. A sheet of paper is sandwiched between the contact image sensor and the roller. The contact image sensor can be disengaged from the roller by an external release rod. The paper is removed when the release rod is actuated or by pulling the paper hard.

3 Claims, 6 Drawing Sheets

SHEET FEEDER SCANNER

This application is a continuation-in-part, of application No. 08/696,569, filed Aug. 6, 1996, now abandoned.

BACKGROUND OF THE INVENTION

This invention relates to a scanner, in particular to a paper feeding mechanism for the scanner.

Scanners are widely used today for reproducing an image digitally. In conventional technology, a contact image sensor and a roller of the scanner are installed on different structures. The main reason for using separate structures is that when the document is clamped, the paper clamped between the image contact sensor and the roller can be released.

A conventional contact image sensor, CIS contains a light source, a focusing lens and a sensor. It is an image reading head. Due to its small exterior dimensions and light weight, it is widely used in facsimile machines and paper-feeding image scanners. Today, small size and light weight are the direction where the industry devotes it development effort.

FIG. 1 shows the conventional design of a sheet feeding scanner. A contact sensor 1 has a glass window 1d. A document 3 to be scanned is pressure-fed by the roller 2 to engage the contact image sensor 1 and is scanned. The roller 2 is pressed against the document 1d by the radial arm 21 from an axis 9. The contact image sensor 1 has a spring 8a, which pushes the contact image sensor 1 against the roller 2 along the groove 7. Document 3 is fed through window 1d by the rotation of the roller and scanned by the contact image sensor 1.

Such products are sold commercially. For example, Microtek Inc. of Taiwan produces a sheet feeding scanner, under the trade name, Page Wiz; and an American company, Visioneer, produces a paper feeding scanner, under the trade name Paperport, etc. The length, width and height dimensions are 30 cm×10.5 cm×5.5 cm and 30 cm×6.3 cm×9.0 cm, respectively. Since most paper feeding scanner are designed for use with standard A4 size papers, the width is usually 30 cm. Therefore, the size of the scanner is mostly determined by the cross-sectional dimension (perpendicular to the width) of the scanner, and the development effort of most companies is concentrated in reducing the cross-sectional dimensional area. For the afore-mentioned products, the cross-sectional areas are 10.5 cm×5.5 cm and 6.3 cm×9.0 cm, respectively. It is highly desirable to further reduce this cross-sectional area. In U.S. Pat. No. 5,621,544, Ogura et. al disclosed an image reading device, wherein a reading unit and a convey unit are integrally mounted on a U-shaped support unit. The reading unit and the convey unit can be disengaged by turning a semicircular cam against a spring which pushes the reading unit against the convey unit. Both the U-shaped support unit and the cam occupy more space in the housing and are undesirable.

SUMMARY

An object of this invention is to unify the contact image sensor and the roller of a scanner in a single structure. Another object of this invention is to reduce the weight and volume of the structure. Still another object of this invention is to reduce the cost of the scanner.

These objects are achieved in this invention by unifying the contact image sensor and the roller of a scanner in one structure. The contact image sensor is pivoted on two sidewalls along an axis and is capable of turning with respect to that axis. This contact image sensor is pressed against a roller with a paper sandwiched between the contact image sensor and the roller. The pressure is exerted by the gravity of the contact image sensor which hangs above the roller and/or by a spring. The contact image sensor can be disengaged from the roller by pushing a release rod against the contact image sensor. The paper can be extracted when the release rod is actuated, or simply by pulling the paper harder. With this structure, the contact image sensor and the roller can be mounted on the same side walls, thus saving space.

BRIEF DESCRIPTIONS OF THE DRAWINGS

DETAILED DESCRIPTION OF THE PREFERRED EMBODIMENT

Figure 2:
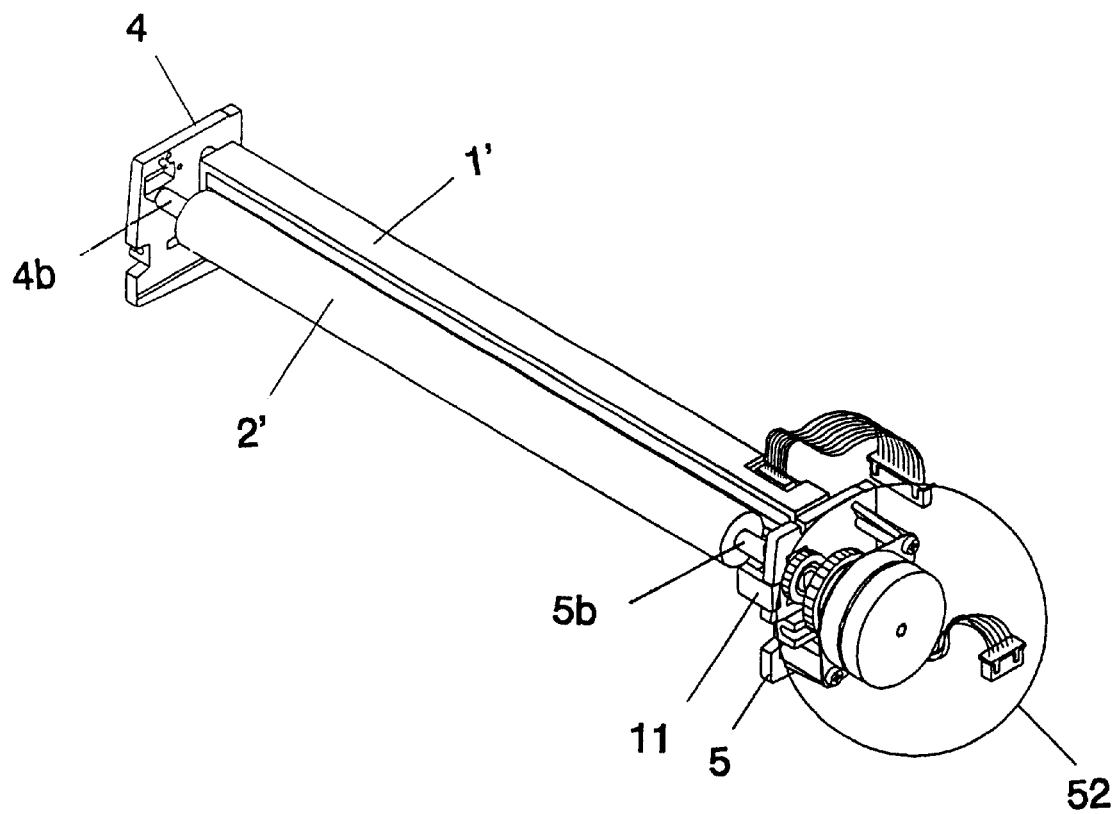
FIG. 2 shows the 3-dimensional view of the present invention.

FIG. 2 shows the 3-dimensional view of the scanning mechanism, base on the present invention. The contact image sensor 1' and the roller 2' are mounted on two sidewalls 4 and 5 through two separate axes. Two walls are mounted directly on the frame of the scanner linked by grooves formed inside surface of the frame, as contrasted from the prior art disclosed in U.S. Pat. No. 5,621,544 using a U-shaped subassmebly t mount the reading unit (the contact image sensor) and the convey unit (roller) which occupy more space in the scanner housing. Referring FIG. 3, the contact image sensor 1' has one end 1h' pivoted on sidewall 4 through pin 4a. The other end of the contact image sensor is pivoted on side wall 5 through pin 5a. The pin 5a is extended outside the sidewall 5. One end 4b of the roller 2' is pivoted to the sidewall 4 and the other end 5b is pivoted to the sidewall 5. The end 5b is geared to a driving mechanism 52 to turn the roller 2'.

One feature of this invention is that the contact image sensor 1' and the roller 2' are both mounted on the side walls 4 and 5. In prior art, the contact image sensor and the roller are mounted on separate side walls in order to separate the contact image sensor and the roller for dispatching the clamped paper.

A second feature of this invention is that the contact image sensor is pivoted on the sidewalls 4 and 5 by a pin, thus allowing the contact image sensor to rotate with respect to the axis of the pin. In the prior art, the contact image sensor cannot rotate and is recessed in a groove (7 in FIG. 1), which only allows movement within the confines of the groove against a spring action (8a in FIG. 1).

Figure 3:
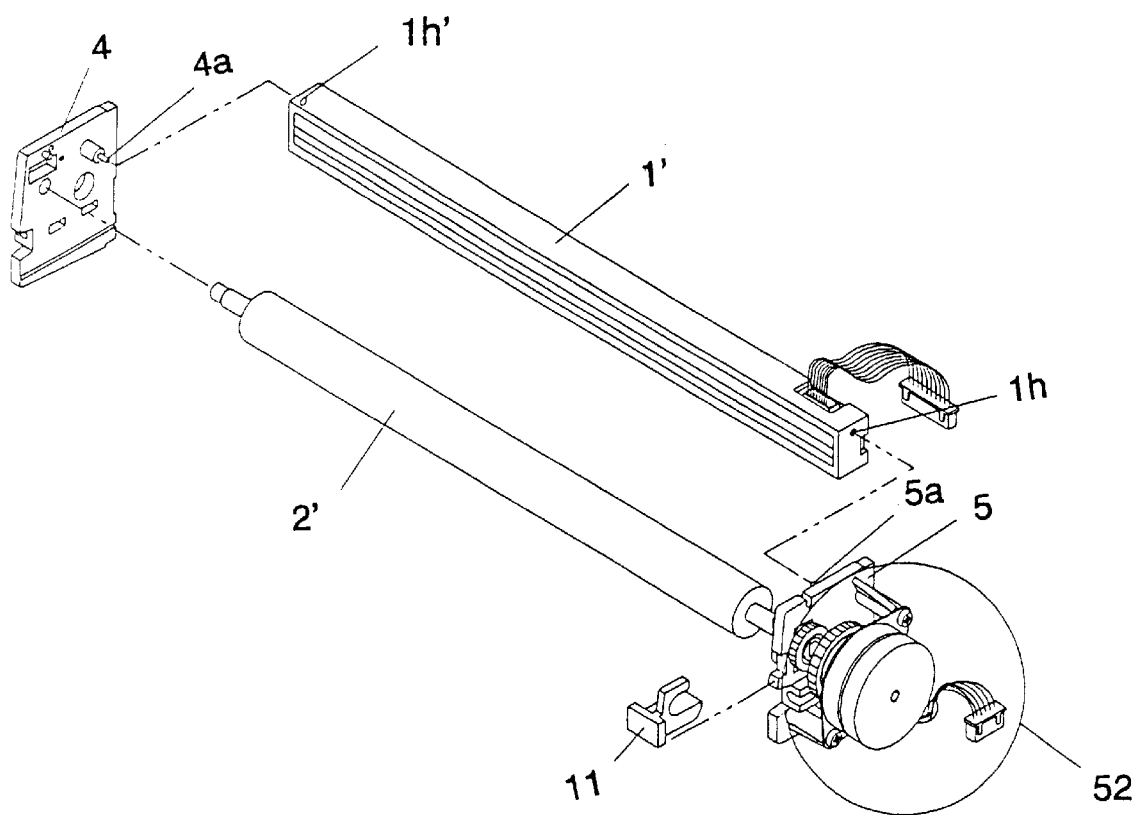
FIG. 3 shows the different components of the present invention.

A third feature of this present invention is that the document release rod 11 straddles over the end 5b of the roller 2' as shown in FIG. 3. One end of the release rod 11 is in contact with the contact image sensor 1' as shown in FIG. 4. When the release rod 11 is pressed at the other end, the release rod 11 exerts pressure on the contact image sensor 1' to rotate slightly with respect to the axes 4a and 5a. This slight rotation disengages the contact image sensor 1' from the roller 2'. Thus, the document 3' clamped between the contact image sensor 1' and the roller 2' is released. In the prior art, there has been neither any release rod nor such action. In practical design, it is possible to implement the action without a release rod by pulling harder the document clamped between the contact image sensor 1' and the roller 2'.

Figure 1:
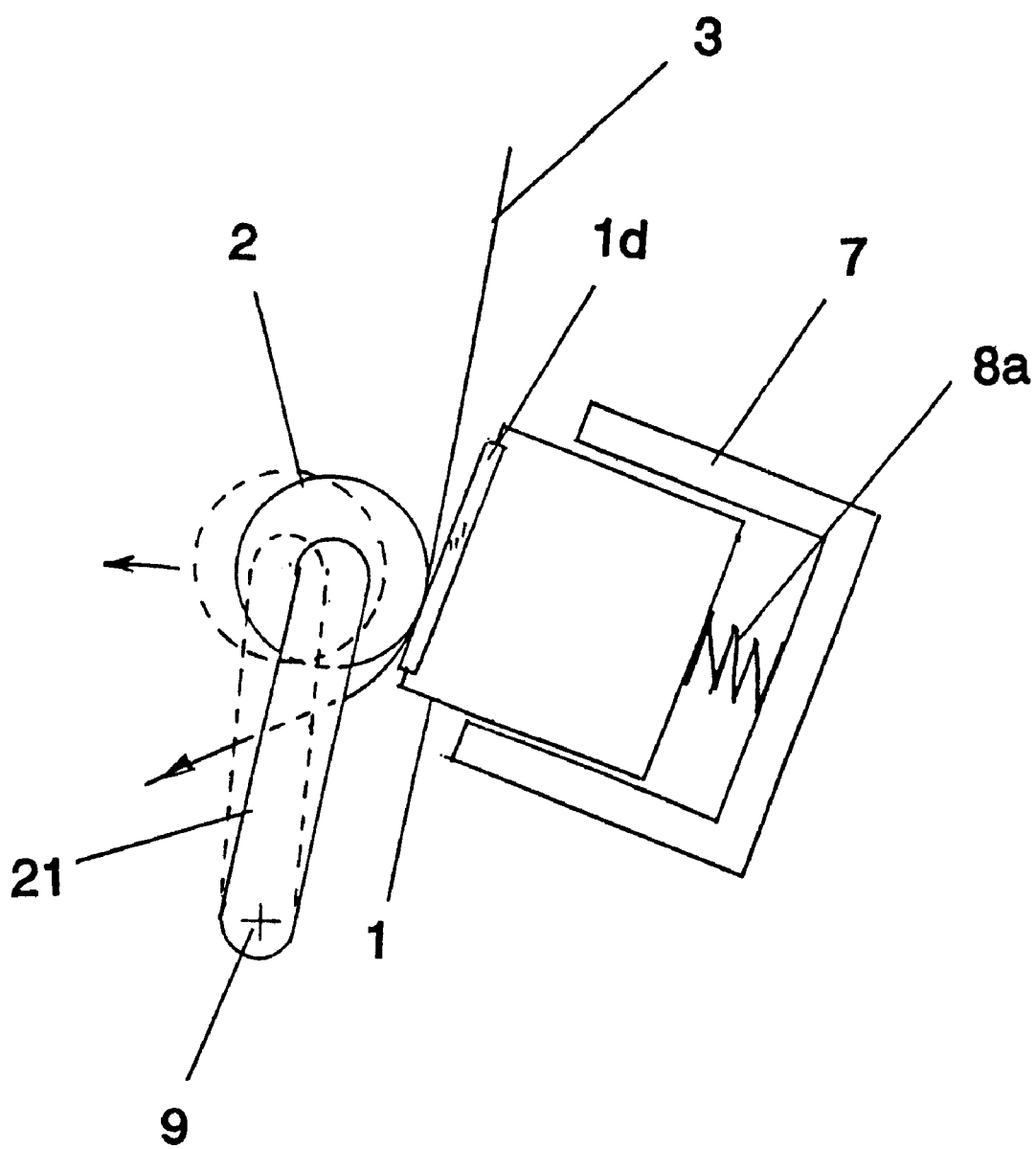
FIG. 1 shows a prior art scanner.

A fourth feature of the present invention is the elimination of the groove 7 in the prior art shown in FIG. 1.

A fifth feature of the present invention is the elimination of the pressure arm 1 for the roller 2 in the prior art shown in FIG. 1.

A sixth feature of the present invention is the elimination of disengagement mechanism of the contact image sensor 1 and the roller 2 in the prior art shown in FIG. 1 by rotating the arm 21 with respect to axis 9. In the first embodiment of the present invention as shown in FIG. 2, the release rod 11 can produce a narrow gap between the contact image sensor 1' and the roller 2' to release the document 3'. In the second embodiment of the present invention, no release rod is used the document 3' is pulled hard to be released.

Figure 4A:
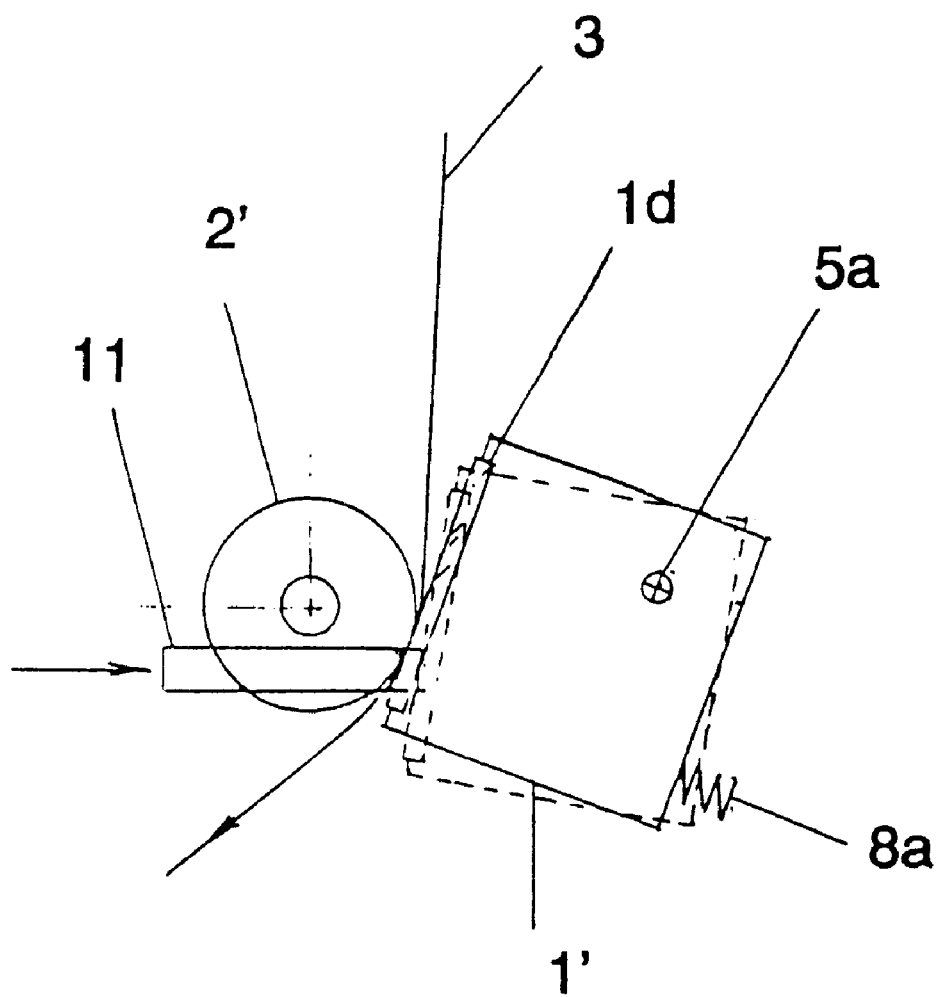
FIG. 4A shows one embodiment of the present using a push rod action for releasing the document to be scanned.

FIG. 4a shows the release action of the first embodiment of the present invention. One end of the document release rod 11 shown in FIG. 3 is for a user to press. The other end of the release rod is in contact with the contact image sensor 1'. A spring 8a' is pressed against the opposite side of the contact image sensor 1'. When the release rod is not actuated, the spring 8a' presses the contact image sensor 1' to engage the roller 2'. The disengagement is made by the push rod in a linear wedging motion so that positive action can be effected without using a side cam regardless of the tilt of the scanner and space is saved as compared to any mechanism which requires 2-dimensional (cam) motion and 2-dimensional space such as the disclosed by Ogura in U.S. Pat. No. 5,621,544.

Figure 4B:
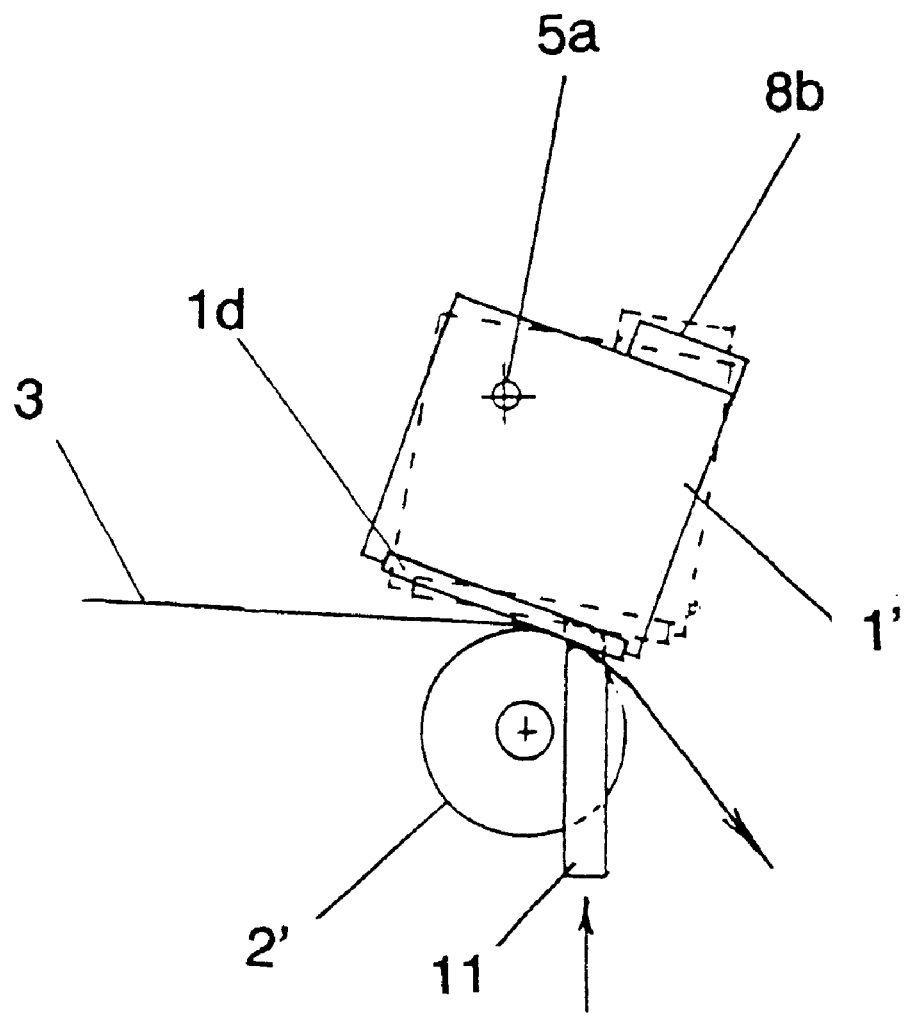
FIG. 4B shows another embodiment of the present invention using the push rod action for releasing the document to be scanned.

FIG. 4b shows the release action of the second embodiment of the present invention. On end of the document release rod 11 as shown in FIG. 3 is for a user to press. The other end of the release rod is in contact with the contact image sensor 1'. The contact image sensor 1' is placed over the roller 2'. The weight of the contact image sensor 1' with or without an additional weight 8b on the contact image sensor 1' is sufficient to cause the contact image sensor 1', which hangs at the axis 5a, to engage the roller 2' by gravity.

Figure 5:
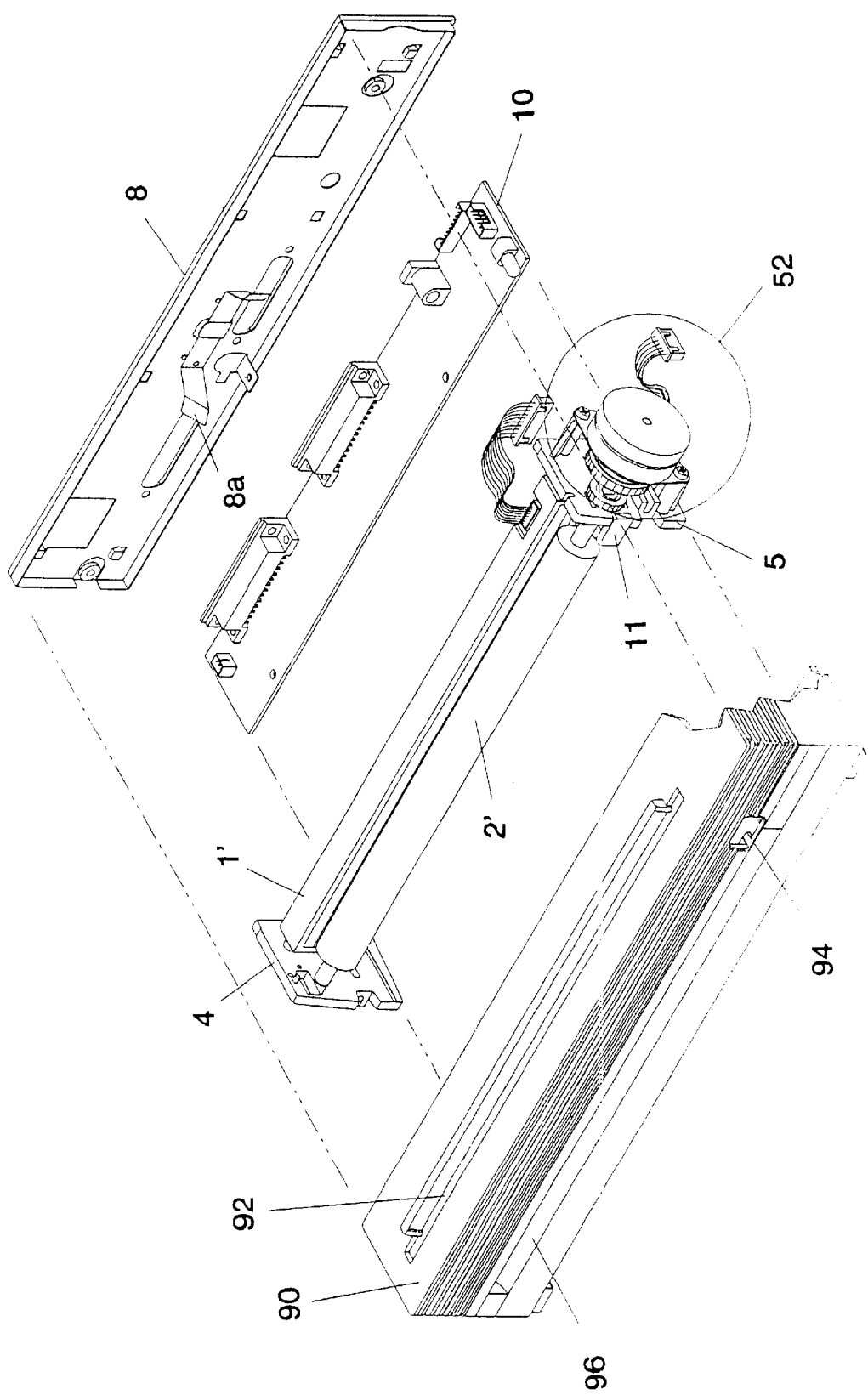
FIG. 5 shows the frame of the scanner for the present invention.

FIG. 5 shows the frame of the complete scanner. A frame 90 houses an input slot 92 to guide and feed the document 3' for scanning. Another output slot 96 is used to guide the document already scanned. A feedthrough hole 94 is provided for the release rod to protrude and be pushed. Inside the frame 90 are the contact image sensor 1', the roller 2', the sidewalls 4, 5 of the driving mechanism 52 described in the previous paragraphs, and a printed circuit board 10 which mounts the electronic circuits for controlling the operation of the scanner. The frame has a back cover 8, on which is mounted the spring 8a' for pushing the contact image sensor 1' with sufficient force to engage the roller 2'.

The foregoing description is two embodiments of the present invention. Any modifications using the same principle of pivoting the contact image sensor to engage the driving roller and mounting the roller in the same frame are all within the scope of this invention.

What is claimed is:

1. A sheet feeding scanner, comprising:

a frame for housing said scanner;

a contact image sensor for scanning and reading a document;

a roller for engaging said contact image sensor and dragging said document so that the content of said document can be scanned;

a driving mechanism for driving said roller; two side walls, fitted into grooves formed inside a surface of the frame on which both said roller and said contact image sensor are pivoted such that both said roller and said contact image sensor are normally in contact:

a release rod for disengaging said contact image sensor and said roller, wherein the release rod makes direct contact with the contact image sensor, and can be pushed against the contact image sensor with a linear wedging motion to release the document which has been scanned and clamped between said contact image sensor and the roller; and means for re-engaging said contact image sensor with said roller by at least a spring pushing said contact sensor against roller.

2. A sheet feeding scanner as described in claim 1, wherein said contact image sensor is pivoted eccentrically in the upper portion of said contact image sensor.

3. A sheet feeding scanner, comprising:

two sidewalls opposite to each other;

a contact image sensor pivotally mounted on the two side walls for scanning a document;

a roller rolling against the contact image sensor and dragging the document so that the document can be scanned by the contact image sensor;

a document release rod straddling over an end of the roller and directly contacting with the contact image sensor; and a spring for pressing the contact image sensor toward the roller, wherein when the document release rod is pressed by a user, the document release rod goes from a non-pressed position to a pressed position and directly pushes the contact image sensor to rotate away from the roller, and when the user is not pressing on the document release rod, the spring pushes the contact image sensor to rotate toward the roller, and the contact image sensor directly pushes the document release rod from the pressed position to the non-pressed position.

* * * * *